US011431699B2

(12) United States Patent
Wang

(10) Patent No.: US 11,431,699 B2
(45) Date of Patent: Aug. 30, 2022

(54) METHOD AND DEVICE FOR PROCESSING USER OPERATION

(71) Applicant: ALIBABA GROUP HOLDING LIMITED, Grand Cayman (KY)

(72) Inventor: Benjie Wang, Hangzhou (CN)

(73) Assignee: ALIBABA GROUP HOLDING LIMITED, George Town (KY)

(*) Notice: Subject to any disclaimer, the term of this patent is extended or adjusted under 35 U.S.C. 154(b) by 321 days.

(21) Appl. No.: 15/837,166

(22) Filed: Dec. 11, 2017

(65) Prior Publication Data
US 2018/0167379 A1 Jun. 14, 2018

(30) Foreign Application Priority Data
Dec. 12, 2016 (CN) .......................... 201611141178.3

(51) Int. Cl.
G06F 16/951 (2019.01)
G06F 16/955 (2019.01)
(Continued)

(52) U.S. Cl.
CPC ........ H04L 63/0815 (2013.01); G06F 16/951 (2019.01); G06F 16/955 (2019.01);
(Continued)

(58) Field of Classification Search
CPC .................... H04L 63/0815; G06F 21/6209
See application file for complete search history.

(56) References Cited

U.S. PATENT DOCUMENTS 6,408,306 B1    6/2002  Byrne et al.
7,363,241 B1*  4/2008  Dong ..................... G06Q 10/02
                                                   705/5
(Continued)

FOREIGN PATENT DOCUMENTS

CN    101072240 A    11/2007
CN    102075499 A     5/2011
(Continued)

OTHER PUBLICATIONS

International Search Report and Written Opinion for Application No. PCT/US2017/065523, dated Apr. 5, 2018, 19 pages.
(Continued)

Primary Examiner — Jeffrey Nickerson
Assistant Examiner — Thanh H Le

(57) ABSTRACT

The present disclosure provides systems and methods for processing operation. An exemplary method for processing operation, implementable by a terminal, may comprise: displaying a target web page, wherein the target web page comprises a first control element and a second control element, the first control element is configured to acquire an account identifier for an account, and the second control element is configured to correlate the account identifier and an operation request for executing the operation request without logging in the account after the operation request is correlated with the account identifier; acquiring the account identifier in response to a trigger action on the second control element; and sending the account identifier and the operation request that is correlated by the second control element to a server corresponding to the target web page.

22 Claims, 9 Drawing Sheets

(51) Int. Cl.
  *G06F 21/31* (2013.01)
  *G06F 3/04847* (2022.01)
  *H04L 67/306* (2022.01)
  *H04L 9/40* (2022.01)
  *G06F 21/62* (2013.01)

(52) U.S. Cl.
  CPC .......... *G06F 21/31* (2013.01); *G06F 21/6209* (2013.01); *G06F 3/04847* (2013.01); *H04L 67/306* (2013.01)

(56) References Cited

U.S. PATENT DOCUMENTS

| | | | |
|---|---|---|---|
| 7,865,414 B2 * | 1/2011 | Fung | G06Q 20/382 705/35 |
| 8,073,895 B2 * | 12/2011 | Hamzeh | G06F 9/44526 709/200 |
| 8,627,479 B2 * | 1/2014 | Wittenstein | H04L 63/1425 726/25 |
| 10,025,913 B2 * | 7/2018 | Tian | H04L 63/0236 |
| 2003/0067495 A1 | 4/2003 | Pu et al. | |
| 2003/0084177 A1 | 5/2003 | Mulligan | |
| 2004/0230536 A1 * | 11/2004 | Fung | G06Q 20/382 705/64 |
| 2006/0235961 A1 | 10/2006 | Klein | |
| 2007/0254661 A1 | 11/2007 | Chowdhury et al. | |
| 2008/0071885 A1 | 3/2008 | Hardy et al. | |
| 2008/0098225 A1 | 4/2008 | Baysinger | |
| 2009/0158032 A1 | 6/2009 | Costa et al. | |
| 2010/0017616 A1 * | 1/2010 | Nichols | G06F 21/41 713/183 |
| 2010/0043062 A1 | 2/2010 | Alexander et al. | |
| 2010/0251162 A1 | 9/2010 | Stallings et al. | |
| 2010/0287606 A1 | 11/2010 | Machani | |
| 2011/0279851 A1 * | 11/2011 | Berger | H04L 51/00 358/1.15 |
| 2011/0283196 A1 | 11/2011 | Berger et al. | |
| 2012/0011577 A1 | 1/2012 | Mashimo | |
| 2013/0024914 A1 | 1/2013 | Ahmed et al. | |
| 2013/0166918 A1 | 6/2013 | Shahbazi et al. | |
| 2013/0174090 A1 | 7/2013 | Fan | |
| 2014/0173708 A1 | 6/2014 | Garlick | |
| 2014/0282949 A1 | 9/2014 | Nath et al. | |
| 2014/0323166 A1 | 10/2014 | Zhang et al. | |
| 2014/0372303 A1 | 12/2014 | Gafni | |
| 2015/0067804 A1 | 3/2015 | Maxwell | |
| 2015/0095984 A1 * | 4/2015 | Adsule | H04L 63/10 726/4 |
| 2016/0006717 A1 | 1/2016 | Ji | |
| 2016/0119313 A1 | 4/2016 | Zhang | |
| 2016/0197904 A1 | 7/2016 | Taratine et al. | |
| 2016/0253481 A1 | 9/2016 | Tian et al. | |
| 2016/0269398 A1 * | 9/2016 | Chhabra | H04L 63/0838 |
| 2018/0264361 A1 | 9/2018 | Wang et al. | |

FOREIGN PATENT DOCUMENTS

| | | | |
|---|---|---|---|
| CN | 104283843 A | 1/2015 | |
| CN | 104731473 A | 6/2015 | |
| CN | 106021419 A | 10/2016 | |
| TW | I497426 B | 8/2015 | |
| WO | WO-2013169916 A2 * | 11/2013 | H04W 4/203 |

OTHER PUBLICATIONS

Supplementary Search for Chinese Application No. 201611141178.3 dated Dec. 29, 2020.
First Search dated Jun. 29, 2020, issued in related Chinese Application No. 201611141178.3 (2 pages).
First Office Action dated Jul. 3, 2020, issued in related Chinese Application No. 201611141178.3, with English machine translation (22 pages).
https://www.zhihu.com/question/35007003; "When doing product design, get a coupon link shared by others, do you need to verify after entering the mobile phone number to get the coupon?", Aug. 30, 2015 (11 pages).
Search Report for Taiwanese Application No. 106126102 dated Jul. 29, 2021.
Supplementary Search for Chinese Application No. 201611141178.3 dated Apr. 26, 2021.

* cited by examiner

METHOD AND DEVICE FOR PROCESSING USER OPERATION

CROSS REFERENCE TO RELATED APPLICATIONS

The present application is based on and claims priority to the Chinese Application No. 201611141178.3, filed Dec. 12, 2016, the entire contents of which are incorporated herein by reference.

TECHNICAL FIELD

The present application relates to the technical field of operation processing, and in particular, to methods and devices for processing user operations.

RELATED ART

A user may register an account from a website and set up an account name and a password of the account. As shown in FIG. 1, when using a terminal to log in to the account on the website, the user needs to enter the account name and the password. Next, the terminal sends the account name and the password to a website server to perform verification. If the verification succeeds, the user is set to a logged-in state, so that the user can perform certain operations provided by the website.

If the terminal uses a browser for the user to log in to the account, because the browser has relatively low security, the server monitors the duration of sessions between the terminal and the server in such login manner. If the duration of the session exceeds a validity period, the server forces a logout from the account. When performing some operations subsequently, the user needs to re-enter the account name and the password to perform login.

Since the server often sets a relatively short validity period for a session, the user has to frequently enter the account name and the password to perform login, causing poor user experience.

SUMMARY

In view of this, the present application provides methods for processing user operation. The disclosed systems and methods can at least mitigate the problem set forth above.

According to one aspect, a method for processing operation is disclosed. The method can be implementable by a terminal. The method includes: displaying a target web page, where the target web page includes a first control element and a second control element, the first control element is configured to acquire an account identifier for an account, and the second control element is configured to correlate the account identifier and an operation request for executing the operation request without logging in the account after the operation request is correlated with the account identifier; acquiring an account identifier in response to a trigger action on the second control element; and sending the account identifier and the operation request that is correlated by the second control element to a server corresponding to the target web page.

In some embodiments, the first control element is in a hidden state; and the acquiring an account identifier in response to a trigger action on the second control element includes: searching, in response to the trigger action on the second control element, the terminal locally to determine whether an account identifier corresponding to the target web page is stored; and in response to obtaining a stored account identifier corresponding to the target web page, using the stored account identifier as the acquired account identifier.

In some embodiments, the method for processing operation further includes: displaying the first control element in response to obtaining multiple stored account identifiers corresponding to the target web page; displaying the multiple stored account identifiers in the first control element; and using, in response to a selection instruction of a user, an account identifier selected by the user as the acquired account identifier.

In some embodiments, the method for processing operation further includes: displaying the first control element in response to that no stored account identifier corresponding to the target web page is found; and receiving an account identifier entered by a user in the first control element.

In some embodiments, the acquiring an account identifier in response to a trigger action on the second control element includes: monitoring the trigger action on the second control element; and acquiring the account identifier if the trigger action meets a preset trigger condition.

In some embodiments, the second control element is a slide control element; and the monitoring the trigger action on the second control element includes: monitoring a slide parameter of the second control element, where the slide parameter includes at least one subparameter of: slide frequency, slide speed, or slide duration.

In some embodiments, the acquiring the account identifier if the trigger action meets a preset trigger condition includes: determining, if the slide parameter includes the subparameter slide frequency, whether the slide frequency is greater than a preset frequency threshold, to obtain a determination result corresponding to the slide frequency; determining, if the slide parameter includes the subparameter slide speed, whether the slide speed is greater than a preset speed threshold, to obtain a determination result corresponding to the slide speed; determining, if the slide parameter includes the subparameter slide duration, whether the slide duration is less than a preset duration threshold, to obtain a determination result corresponding to the slide duration; and acquiring the account identifier if the determination results corresponding to the subparameters included in the slide parameter are all positive.

In some embodiments, the acquiring the account identifier if the trigger action meets a preset trigger condition includes: sending the detected trigger action to the server corresponding to the target web page, causing the server to determine whether the trigger action meets the preset trigger condition and return a determination result; and acquiring the account identifier if the received determination result returned by the server is positive.

In some embodiments, the method for processing operation further includes: receiving an identification code returned by the server, where the identification code is generated by the server when the trigger action meets the preset trigger condition, and the identification code corresponds to a session at which the identification code is generated; and the sending the account identifier and the operation request that is correlated by the second control element to a server corresponding to the target web page includes: sending an identifier of the session between the terminal and the server corresponding to the target web page, the identification code, the account identifier, and the operation request that is correlated by the second control element to the server corresponding to the target web page.

In some embodiments, the method for processing operation further includes: after a processing result returned by the server is received, determining a display style corresponding to a type of the processing result, where the processing result is obtained by the server according to the account identifier and an operation correlated by the second control element; and setting a display style of the second control element to the determined display style.

According to another aspect, a method for processing operation is disclosed. The method can be implementable by a server. The method includes: after receiving from a terminal an account identifier for an account and an operation request correlated with the account identifier; determining whether the account identifier is an identifier of a registered account; in response to determining that the account identifier is an identifier of a registered account, executing a processing procedure corresponding to the account identifier and the correlated operation request; and returning a processing result corresponding to the execution to the terminal. The account identifier is acquired by a first control element implemented by the terminal, and the operation request is acquired and correlated by a second control element implemented by the terminal for executing the operation request without logging in the account after the operation request is correlated with the account identifier.

In some embodiments, the method for processing operation implementable by the server further includes: in response to determining that the account identifier is not an identifier of a registered account, returning a failure processing result to the terminal.

According to another aspect, an apparatus for processing operation is disclosed. The apparatus can be implementable on a terminal. The apparatus includes: a unit for displaying a target web page, configured to display a target web page, where the target web page includes a first control element and a second control element, the first control element is configured to acquire an account identifier for an account, and the second control element is configured to correlate the account identifier and an operation request for executing the operation request without logging in the account after the operation request is correlated with the account identifier; a unit for acquiring an account identifier, configured to acquire an account identifier in response to a trigger action on the second control element; and a unit for sending an account identifier and an operation request, configured to send the account identifier and the operation request that is correlated by the second control element to a server corresponding to the target web page.

In some embodiments, the first control element is in a hidden state; and in the aspect of acquiring an account identifier in response to a trigger action on the second control element, the unit for acquiring an account identifier is configured to: search, in response to the trigger action on the second control element, the terminal locally to determine whether an account identifier corresponding to the target web page is stored; and in response to obtaining a stored account identifier corresponding to the target web page, use the stored account identifier as the acquired account identifier.

In some embodiments, the unit for acquiring an account identifier is further configured to: display the first control element in response to obtaining multiple stored account identifiers corresponding to the target web page are found; display the multiple stored account identifiers in the first control element; and use, in response to a selection instruction of a user, an account identifier selected by the user as the acquired account identifier.

In some embodiments, the unit for acquiring an account identifier is further configured to: display the first control element in response to that no stored account identifier corresponding to the target web page is found; and receive an account identifier entered by a user in the first control element.

In some embodiments, in the aspect of acquiring an account identifier in response to a trigger action on the second control element, the unit for acquiring an account identifier is configured to: monitor the trigger action on the second control element; and acquire the account identifier if the trigger action meets a preset trigger condition.

In some embodiments, the second control element is a slide control element; and in the aspect of monitoring the trigger action on the second control element, the unit for acquiring an account identifier is configured to: monitor a slide parameter of the second control element, where the slide parameter includes at least one subparameter of: slide frequency, slide speed, or slide duration.

In some embodiments, in the aspect of acquiring the account identifier if the trigger action meets a preset trigger condition, the unit for acquiring an account identifier is configured to: determine, if the slide parameter includes the subparameter slide frequency, whether the slide frequency is greater than a preset frequency threshold, to obtain a determination result corresponding to the slide frequency; determine, if the slide parameter includes the subparameter slide speed, whether the slide speed is greater than a preset speed threshold, to obtain a determination result corresponding to the slide speed; determine, if the slide parameter includes the subparameter slide duration, whether the slide duration is less than a preset duration threshold, to obtain a determination result corresponding to the slide duration; and acquire the account identifier if the determination results corresponding to the subparameters included in the slide parameter are all positive.

In some embodiments, in the aspect of acquiring the account identifier if the trigger action meets a preset trigger condition, the unit for acquiring an account identifier is configured to: send the detected trigger action to the server corresponding to the target web page, causing the server to determine whether the trigger action meets the preset trigger condition and return a determination result; and acquire the account identifier if the received determination result returned by the server is positive.

In some embodiments, the apparatus for processing operation further includes: a unit for receiving an identification code, configured to receive an identification code returned by the server, where the identification code is generated by the server when the trigger action meets the preset trigger condition, and the identification code corresponds to a session at which the identification code is generated; and in the aspect of sending the account identifier and the operation request that is correlated by the second control element to a server corresponding to the target web page, the unit for sending an account identifier and an operation request is configured to: send an identifier of the session between the terminal and the server corresponding to the target web page, the identification code, the account identifier, and the operation request that is correlated by the second control element to the server corresponding to the target web page.

In some embodiments, the apparatus for processing operation further includes: a unit for setting a style of a second control element, configured to: after a processing result returned by the server is received, determine a display style corresponding to a type of the processing result, where the processing result is obtained by the server according to the account identifier and an operation correlated by the second control element; and set a display style of the second control element to the determined display style.

According to another aspect, an apparatus for processing operation is disclosed. The apparatus can be implementable on a server. The apparatus includes: a unit for receiving an account identifier and an operation request, configured to: after receiving from a terminal an account identifier and an operation request correlated with the account identifier; determine whether the account identifier is an identifier of a registered account for an account; and in response to determining that the account identifier is an identifier of a registered account, trigger a unit for processing an operation request; the unit for processing an operation request, configured to execute a processing procedure corresponding to the account identifier and the correlated operation request; and a unit for returning a processing result, configured to return a processing result corresponding to the execution to the terminal. The account identifier is acquired by a first control element implemented by the terminal, and the operation request is acquired and correlated by a second control element implemented by the terminal for executing the operation request without logging in the account after the operation request is correlated with the account identifier.

In some embodiments, the unit for returning a processing result is further configured to: in response to determining that the account identifier is not an identifier of a registered account, return a failure processing result to the terminal.

According to another aspect, a terminal is disclosed. The terminal includes: a display, configured to display a target web page, where the target web page includes a first control element and a second control element, the first control element is configured to acquire an account identifier for an account, and the second control element is configured to correlate the account identifier and an operation request for executing the operation request without logging in the account after the operation request is correlated with the account identifier; a processor, configured to acquire an account identifier in response to a trigger action on the second control element; and a communication interface, configured to send the account identifier and the operation request that is correlated by the second control element to a server corresponding to the target web page.

According to another aspect, a server is disclosed. The server includes: a processor, configured to: after receiving from a terminal an account identifier and an operation request correlated with the account identifier; determine whether the account identifier is an identifier of a registered account; in response to determining that the account identifier is an identifier of a registered account, execute a processing procedure corresponding to the account identifier and the correlated operation request; and a communication interface, configured to return a processing result corresponding to the execution to the terminal. The account identifier is acquired by a first control element implemented by the terminal, and the operation request is acquired and correlated by a second control element implemented by the terminal for executing the operation request without logging in the account after the operation request is correlated with the account identifier.

According to another aspect, an apparatus for processing operation implementable on a terminal is disclosed, the apparatus comprising a processor and a non-transitory computer-readable storage medium storing instructions that, when executed by the processor, cause the processor to perform a method. The method comprises: displaying a target web page, wherein the target web page comprises a first control element and a second control element, the first control element is configured to acquire an account identifier for an account, and the second control element is configured to correlate the account identifier and an operation request for executing the operation request without logging in the account after the operation request is correlated with the account identifier; acquiring the account identifier in response to a trigger action on the second control element; and sending the account identifier and the operation request that is correlated by the second control element to a server corresponding to the target web page.

According to another aspect, an apparatus for processing operation implementable on a server is disclosed, the apparatus comprising a processor and a non-transitory computer-readable storage medium storing instructions that, when executed by the processor, cause the processor to perform a method. The method comprises: after receiving from a terminal an account identifier and an operation request correlated with the account identifier; determining whether the account identifier is an identifier of a registered account; in response to determining that the account identifier is an identifier of a registered account, executing a processing procedure corresponding to the account identifier and the correlated operation request; and returning a processing result corresponding to the execution to the terminal. The account identifier is acquired by a first control element implemented by the terminal, and the operation request is acquired and correlated by a second control element implemented by the terminal for executing the operation request without logging in the account after the operation request is correlated with the account identifier.

As can be seen from the foregoing technical solutions, a method for processing user operation implementable by a terminal is provided. In the method, a displayed web page at least includes two control elements, a first control element is configured to enter an account identifier, and a second control element is configured to correlate the account identifier and an operation request. After a user performs a trigger action on the second control element, only an account identifier is acquired, and the acquired account identifier and the operation request that is correlated by the second control element are sent to a server, so that a step in which a user needs to enter a password is avoided. Moreover, in the method, it is not necessary to jump to a login interface, thereby reducing the duration for page jumping, so that user experience is improved.

BRIEF DESCRIPTION OF THE DRAWINGS

To describe the technical solutions of the embodiments or the prior art more clearly, the following briefly introduces the accompanying drawings required for describing the embodiments or the prior art. The accompanying drawings in the following description merely illustrate some embodiments of the present disclosure, and a person of ordinary skill in the art may still derive other drawings from these accompanying drawings without creative efforts.

DETAILED DESCRIPTION

The following embodiments are merely exemplary. All other embodiments obtained by a person of ordinary skill in the art based on the embodiments of the present disclosure without creative efforts shall fall within the protection scope.

Currently, to perform operations provided on a web page, a user may have to enter an account name and a password repeatedly. If the terminal that renders the web page is a mobile terminal such as a mobile phone, this problem is more irritating, and user experience is poor. In addition, the user may forget the password and cannot perform login, and consequently give up performing the operations.

To solve such problem, in an existing processing method, an SMS verification code is sent to a mobile phone of a user. A terminal prompts a user to enter a mobile number linked to an account. After the user enters the mobile number, the mobile phone receives an SMS (short message) including a verification code. The user enters the verification code in the terminal. The terminal sends the mobile number and the verification code to a website server to perform verification.

This method can help with situations that the user forgets a password and cannot perform login, but still has the following deficiencies. 1. After entering the mobile number, the user needs to wait till the mobile phone receives the SMS including the verification code, causing poor user experience. 2. The user needs to link the mobile number and the account in advance. If the mobile number and the account are not linked, the method cannot be used. Even if the mobile number is linked, if the linked mobile phone is not the terminal or not brought with the terminal, the user cannot obtain the SMS in time, and as a result cannot perform login in time. 3. The SMS including the verification code may cause an extra cost to the user, and the SMS is also vulnerable to interception by a sham base station.

In addition to requiring the user to enter a password to perform login, page jumping often causes extended duration of processing the operation request. For example, when browsing a web page of a website, if a user wants to bookmark an article on the web page, the user clicks a bookmark button on the web page. If the user is not in a logged-in state, the website jumps from a current page to a login page. As described above, the login page may ask for an account name and a password. The user can bookmark the article only when the user successfully enters both the account name and the password. Thus, during bookmarking, the user not only needs to enter the account name and the password to perform login and verification, but also needs to wait for the jumping process of a web page. The processing time of operations is extended, further worsening the user experience.

Figure 1:
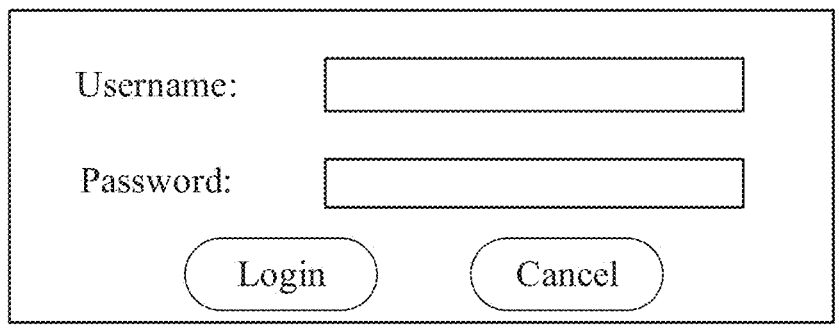
FIG. 1 is a schematic diagram of an account login interface in the prior art.
Figure 2:
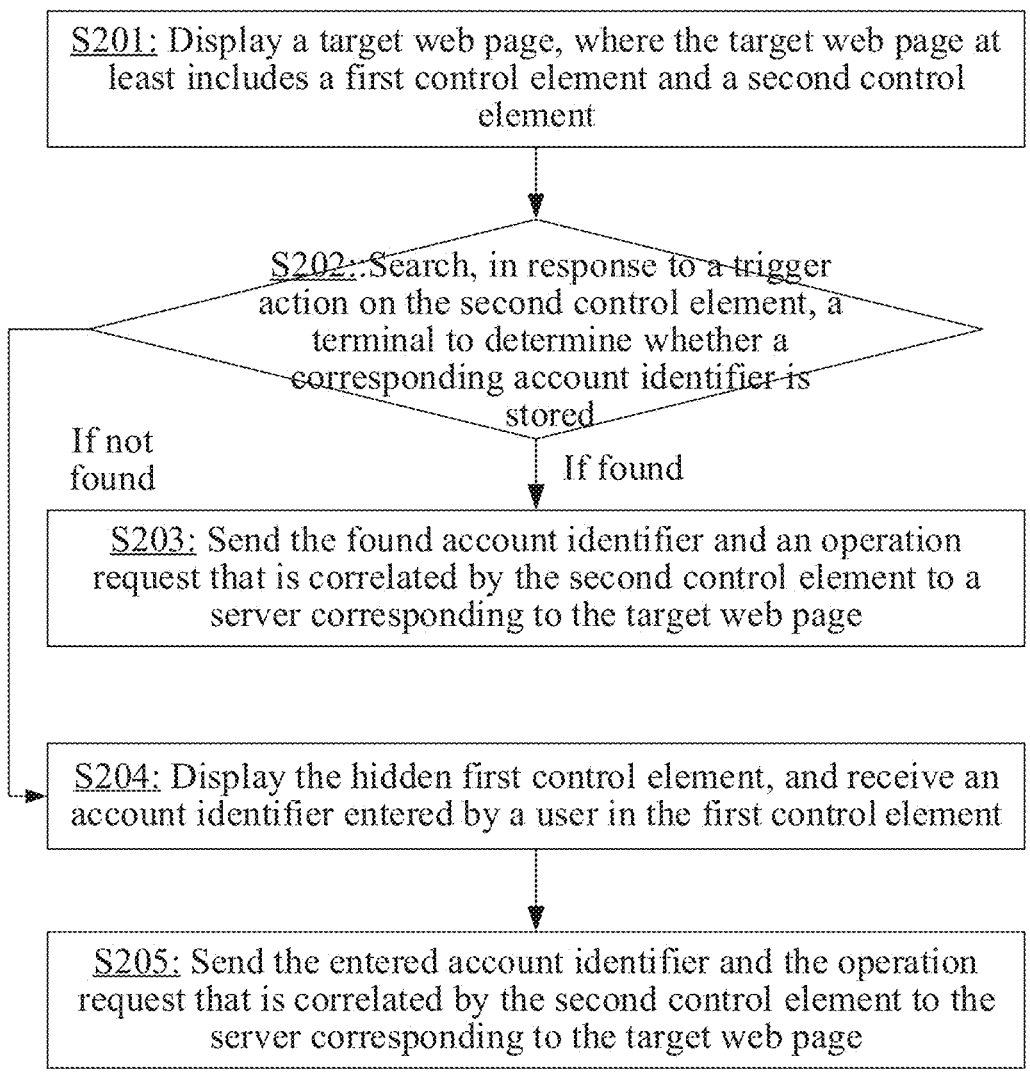
FIG. 2 is a flowchart of a method for processing user operation implementable by a terminal, consistent with exemplary embodiments of the present disclosure.

To resolve the foregoing problem, the present disclosure provides a method for processing user operation. Referring to FIG. 2, FIG. 2 shows a flowchart of the method for processing user operation implementable by a terminal (e.g., a mobile terminal such as a mobile phone). The method includes steps S201 to S205.

Step S201 includes displaying a target web page, where the target web page at least includes a first control element and a second control element.

Before implementation, displayed content and functional logic of a web page may be designed in advance. If the displayed content of a web page includes an operation request that is normally executable only after an account is logged in (that is, the second control element is configured to correlate the account identifier and an operation request for executing the operation request without logging in the account after the operation request is correlated with the account identifier, and the log-in would normally require inputting an account and a password in existing art), two control elements can be embedded in the web page. One control element (the first control elements) is configured to acquire an account identifier (e.g., an account name), and the other control element (the second control element) is configured to correlate the account identifier and an operation request that is executable only after an account is logged in (e.g., an operation request of "grabbing red envelop" (similar to opening a virtual treasure box) that a user may execute when the user is logged-in with his account at a web page providing the red envelop, such that any virtual asset grabbed from the red envelope can be deposited to the user's account). Here, obviating a password input at the second control element, an operation request that the user desires to execute (that was only available after a user logs in with password in the prior art) can be inputted to the second control element and executed. That is, the second control element may not be configured to capture authentication data (e.g., password, pass code, fingerprint, face identification, or the equivalent) for logging into an account corresponding to the account identifier. To ensure security and verify the account, various other techniques described below can authenticate the user and thus permit association of the operation request inputted to the second control element and the account identifier inputted to the first control element. In some embodiments, the terminal may not need to authenticate the user, as long as the account identifier and an operation request are correlated. In some embodiments, the operation request, the trigger action on the second control element, and the second control element may be generic to different user accounts and are not previously associated with account identifiers. Therefore, with the disclosed first and second control elements, the user can accomplish executing the operation request in one step conveniently, rather than having to input account name and password in a first step and input the desired operation request in a second step. In some embodiments, the control element, also known as a widget, may be an element of interaction on a graphical user interface. The control element may comprise button, scroll bar, text input bar, radio input bar, drop-down selection bar, etc.

Figure 3A:
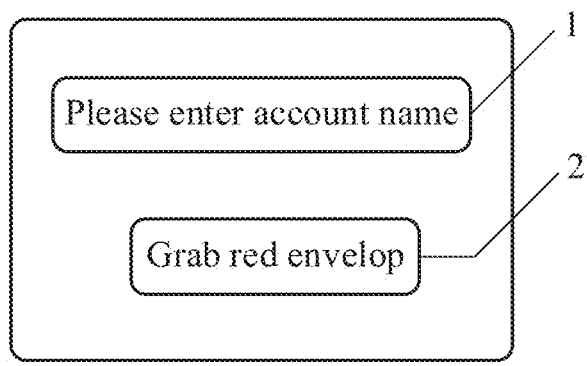
FIG. 3A and FIG. 3B are schematic diagrams of a first control element and a second control element, consistent with exemplary embodiments of the present disclosure.

For example, a web page includes an operation "Grab red envelop" (an operation of increasing virtual asset). It may be understood that, a "red envelop" grabbed by a user needs to be recorded in a personal account of the user. Thus, the web page includes the "Grab red envelop" operation request that is executable only after an account is logged in. As shown in FIG. 3A, two control elements may be embedded in the web page. A control element 1 (e.g., a text entry bar) is configured to acquire an account name of an account of a user (the text "Please enter account name" in the drawing is a prompt to enter an account name). A control element 2 correlates an operation "Grab red envelop" and displays the correlated operation. The second control element may have various forms, such as a fixed button in FIG. 3A, or a slide button in FIG. 3B.

Figure 3B:
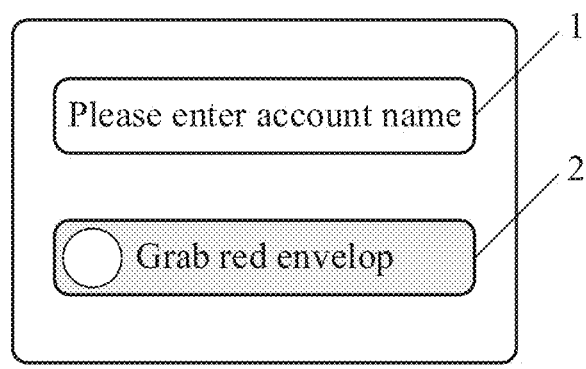

Display positions of the two control elements are not limited to FIG. 3A and FIG. 3B. There may further be various forms, and in one of the forms, for example, the control element 2 is above the control element 1. The account identifier may have various forms such as an account name, an email address, and a mobile number.

For ease of description, the web page may be referred to as a target web page, the control element configured to acquire an account identifier is referred to as the first control element, and the control element configured to correlate the account identifier and an operation request that is executable only after an account is logged in is referred to as the second control element. The "first" and "second" in the first control element and the second control element may not be used to limit display positions of the two control elements, a display order of the two control elements, an order in which the user triggers the two control elements, and the like, and are merely used for convenience of distinguishing the two control elements.

Figure 4A:
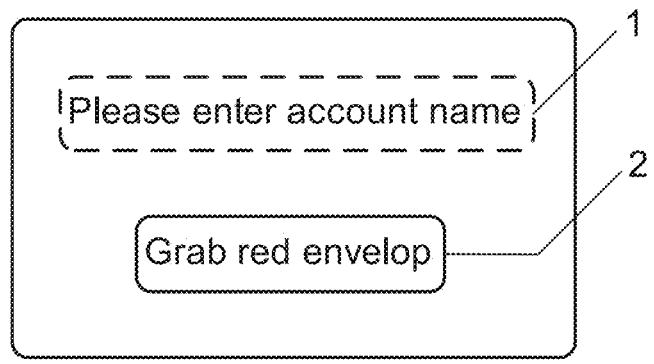
FIG. 4A and FIG. 4B are schematic diagrams of a first control element in a hidden state, consistent with exemplary embodiments of the present disclosure.
Figure 4B:
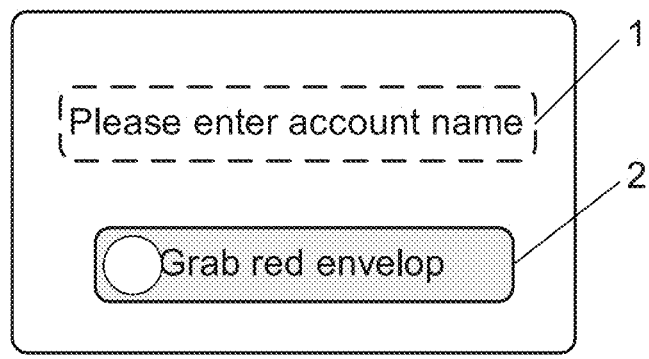

The target web page may be stored on a website server. After the target web page is requested from the website server, the terminal may display the target web page. After the target web page is displayed, the second control element may be directly presented to the user, and the first control element may be in a hidden state. As shown in FIG. 4A and FIG. 4B, the control element 1 in dash-line represents that the control element is in a hidden state. The first control element may alternatively not be in the hidden state. That is, in step S201 of displaying a target web page, the first control element can be directly displayed to the user. In this case, subsequent processing steps are described below.

Step S202 includes searching, in response to a trigger action on the second control element, the terminal to determine whether an account identifier corresponding to the target web page is stored. If an account identifier is found (that is, in response to obtaining a stored account identifier corresponding to the target web page), step S203 can be performed. If no stored account identifier is found, step S204 can be performed.

After the second control element is displayed, if the user desires to perform an operation request presented on the second control element, the user may perform a trigger action on the second control element. The trigger action performed by the user is related to the form of the second control element. For example, if the second control element is a fixed button, the user may perform a click action to trigger. If the second control element is a slide button, the user may perform a slide action to trigger.

After the trigger action performed by the user on the second control element is received, the terminal can be locally searched to determine whether an account identifier corresponding to the target web page is stored. If the user used the terminal to log in to an account, the terminal may have recorded the account identifier of the account that is logged in.

Various cases in which the terminal records the account identifier may be included. For example, the user configures a function of recording account identifiers on the terminal, and the terminal may record the account identifiers in a file. For another example when the terminal uses a browser to access the web page, if before visiting the web page, an account related to the web page and had been logged in on the terminal is used to access the web page or another web page provided by the server of the web page, the terminal may trigger the browser to locally record information of a current session with the web page, where the information includes the account identifier of the account that is logged in.

Therefore, the terminal can be locally searched to find an account identifier corresponding to the target web page. If an account identifier is found (that is, in response to obtaining a stored account identifier corresponding to the target web page), a sending operation in step S203 can be performed. If no stored account identifier is found, an entry action in step S204 can be performed.

Step S203 includes sending the stored account identifier (e.g., the account identifier determined from S202) and the operation request that is correlated by the second control element to a server corresponding to the target web page.

For example, if one account identifier is locally found on the terminal, the account identifier may be directly sent. If multiple stored account identifiers are locally found on the terminal, one of the multiple account identifiers can be selected and sent as the stored account identifier (e.g., the account identifier determined from S202). There may be various manners of selection.

For example, a most recently stored account identifier may be selected. For another example, a mostly used account identifier may be selected. For yet another example, the first control element may be displayed, and multiple stored account identifiers can be displayed on a drop-down list associated with the first control element. When a selection instruction of the user is received, an account identifier indicated by the selection instruction can be selected and sent.

When an account identifier is sent, operation content correlated to the second control element further needs to be sent, to inform the server of the operation selected by the user. For example, the sent account identifier is "Richard," and the sent operation content is "Grab red envelop." The receiving server corresponds to the target web page, or may be considered as a server that provides or includes the target web page. After the account identifier and the operation request are sent to the server, the server processes the operation request according to the account identifier.

Figure 5A:
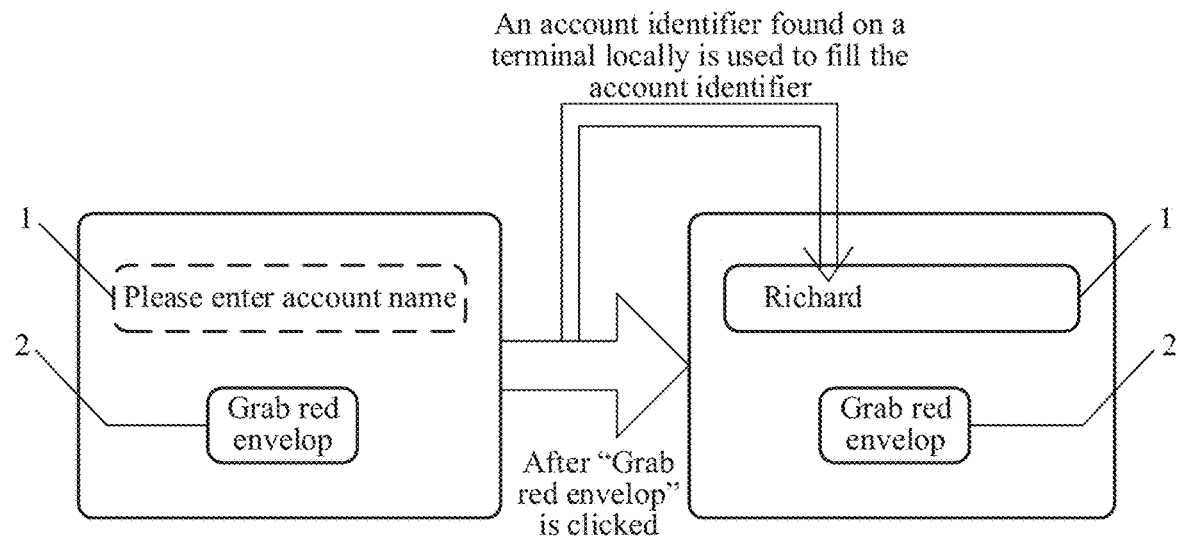
FIG. 5A and FIG. 5B are schematic diagrams of a change of a first control element after a user triggers a second control element, consistent with exemplary embodiments of the present disclosure.
Figure 5B:
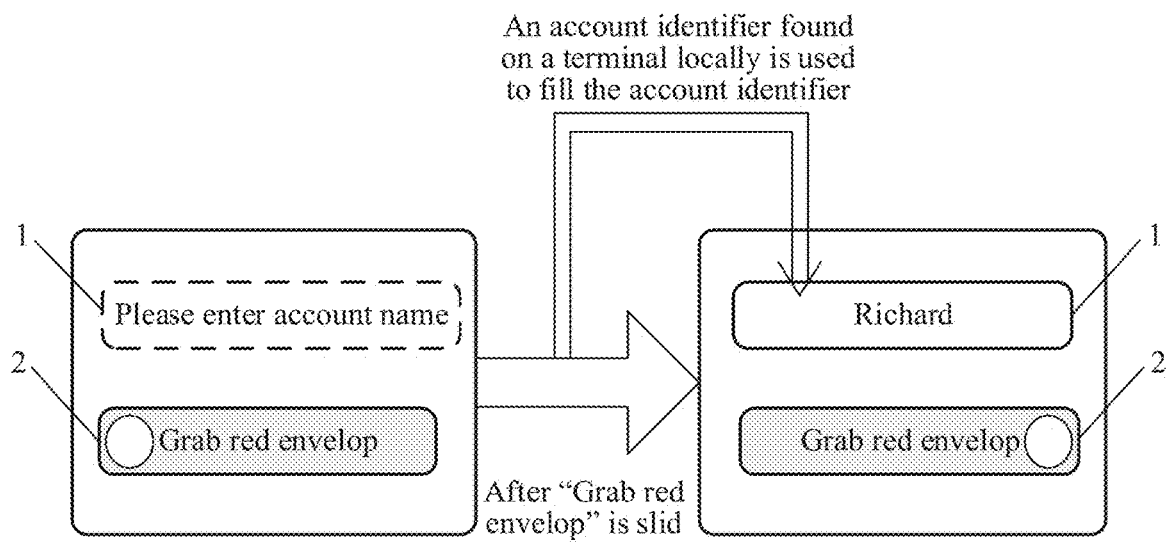

To determine whether the stored account identifier determined from S202 is an account identifier that the user wants to send, before the account identifier is sent, the first control element may be displayed, and the account identifier to be sent may be displayed in the first control element for confirmation by the user. For example, in FIG. 5A and FIG. 5B, the control element 1 can be changed from a dotted-line form into a solid-line form, and the found account identifier Richard can be displayed in the control element 1. The account identifier is sent after being displayed for a preset duration or based on another operation of triggering the second control element by the user.

Step S204 includes displaying the hidden first control element and receiving an account identifier entered by a user in the first control element.

Figure 6A:
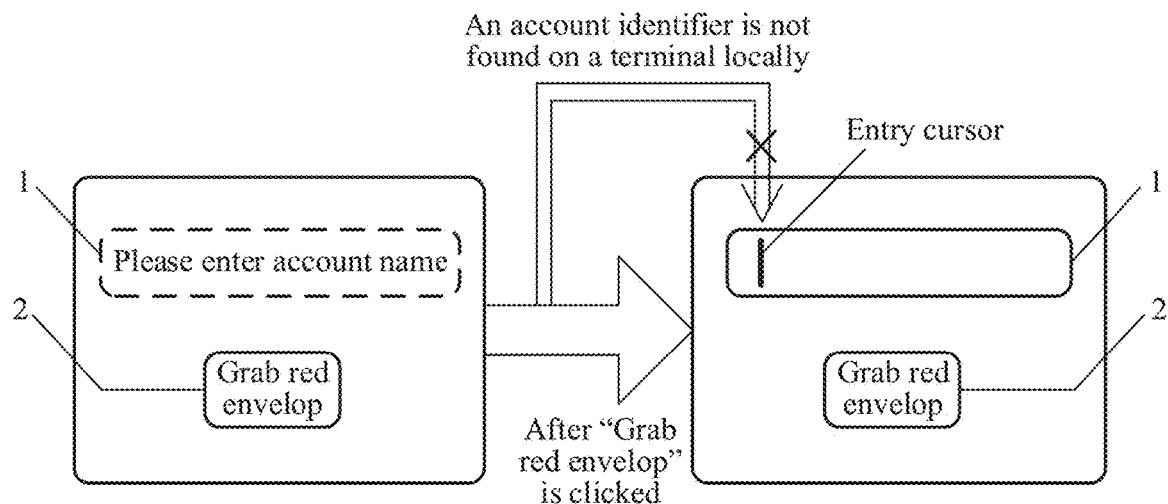
FIG. 6A and FIG. 6B are schematic diagrams of another change of a first control element after a user triggers a second control element, consistent with exemplary embodiments of the present disclosure.

As discussed above, the first control element may be in a hidden state. If an account identifier is not locally found on the terminal, the hidden first control element needs to be displayed, and an entry prompt may further be displayed, for the user to enter an account identifier. For example, in FIG. 6A and FIG. 6B, after the control element 2 is triggered, the control element 1 can be changed from a dotted-line form into a solid-line form. In the drawings, "x" represents that an account identifier is not locally found on the terminal. Therefore, an account identifier is not displayed in the control element 1, but an entry cursor (a thick solid line in the control element 1) can be displayed, to prompt the user to enter an account identifier in the control element 1.

An entered instruction of the user is received, and an account identifier in the entered instruction is displayed in the first control element.

Step S205 includes sending the entered account identifier and the operation request that is correlated by the second control element to the server corresponding to the target web page.

For the sending action in this step, reference may be made to the foregoing description of step S203. Similar details are not repeated herein. A difference between this step and step S203 is that the account identifier sent in this step is an account identifier entered by the user, while the account identifier sent in step S203 is an account identifier locally found on the terminal.

In Step S202, if the account identifier is locally found on the terminal, the found account identifier may be used as the account identifier acquired by using the first control element. Step S204 may accomplish acquiring the account identifier by using the first control element. Further, step S203 and step S205 may accomplish sending the account identifier acquired by the first control element and the operation request correlated by the second control element to the server corresponding to the target web page.

As such, the present disclosure provides a method for processing user operation implementable by a terminal. In the method, a displayed web page at least includes two control elements. A first control element is configured to enter an account identifier, and a second control element is configured to correlate the account identifier and an operation request. After a user performs a trigger action on the second control element, the terminal can be searched locally to determine whether an account identifier related to the web page is stored in the terminal. If an account identifier is found (that is, in response to obtaining a stored account identifier corresponding to the target web page), the found account identifier and the operation request that is correlated by the second control element can be sent to a server, so that the steps of entry by a user are simplified, and user experience is improved. In addition, in the method, it is not necessary to jump to a login interface, thereby reducing the total duration for page jumping, so that user experience is improved.

If an account identifier is not locally found on the terminal, a user is prompted to enter an account identifier in the first control element. Nevertheless, in the method, the user does not need to enter a password, so that the user operation can still be simplified, and the operation request can be completed even if the password is forgotten.

The foregoing solution can be applied in a scenario in which the terminal is a mobile terminal and a browser is used to display a web page. Because a display interface of the mobile terminal has a limited size, it is inconvenient for the user to type information. Moreover, as discussed above, the user needs to frequently perform login when using the browser to access the web page. Provided that the user had entered an account identifier during login, the account identifier may be locally stored on the terminal and retrieved for later use, via automatic acquisition and sending of an account identifier. Thus, the user does not need to frequently enter the account identifier (that is, repeated normal log-ins as described in the background are obviated), so that user experience is improved.

In some embodiments, the first control element in the target web page may be not in a hidden state, but instead, the first control element and the second control element can be displayed to the user together. In this way, after the user performs a trigger action on the second control element, if no stored account identifier corresponding to the target web page is found on the terminal in step S202, and when step S204 is performed, it is not necessary to display the hidden first control element. Instead, the account identifier entered by the user in the first control element can be directly received, and the sending step in step S205 is performed.

If the first control element is hidden as described in the earlier method, the viewing experience of the user may be better, while in this method, a processing method may be simplified and the step of displaying the first control element can be obviated. The two methods have respective advantages, and a corresponding method can be selected according to an actual application.

During implementation, the second control element may comprise a slide control element, as shown in FIG. 3B, FIG. 4B, FIG. 5B, and FIG. 6B. A process in which a slide component is slid is monitored, so that an object that implements a slide action can be verified, thereby preventing a malicious slide.

For example, the foregoing step S202 (searching, in response to a trigger action on the second control element, the terminal to determine whether an account identifier corresponding to the target web page is stored) may include steps A1 and A2 below.

Step A1 includes monitoring a trigger action received by the second control element.

If the second control element is a slide component, a slide parameter such as slide frequency, slide speed, and slide duration of the second control element during a slide may be monitored. Each slide parameter may comprise one or more subparameters.

Step A2 includes, if the trigger action meets a preset trigger condition, searching the terminal to determine whether an account identifier corresponding to the target web page is stored.

If the slide parameter includes a subparameter slide frequency, whether the slide frequency is greater than a preset frequency threshold can be determined, to obtain a determination result corresponding to the slide frequency. If the slide parameter includes a subparameter slide speed, whether the slide speed is greater than a preset speed threshold can be determined, to obtain a determination result corresponding to the slide speed. If the slide parameter includes a subparameter slide duration, whether the slide duration is less than a preset duration threshold can be determined, to obtain a determination result corresponding to the slide duration.

If the determination results corresponding to the subparameters included in the slide parameter are all positive, it indicates that the trigger action meets the preset trigger condition, so that the step of searching for an account identifier may be performed.

If a determination result corresponding to any subparameter included in the slide parameter is no, it indicates that the trigger action does not meet the preset trigger condition, so that an error prompt may be outputted. Furthermore, the terminal may further be recorded on a blacklist.

In an example, the foregoing determination action may be performed by a server. That is, the terminal may send the detected slide parameter to the server, so that the server performs the foregoing determination and generates a determination result. The determination result may be an identification code. The identification code is unique and has a validity period. The server returns the identification code to the terminal. When the terminal performs step S203 or step S205, sending the account identifier and the operation request to the server, the terminal may further send the identification code, so that the server performs secondary human-machine identification on the slide action on the terminal according to the identification code. Further details can be referred to the solution on the side of the server. Details are not described herein.

Figure 7:
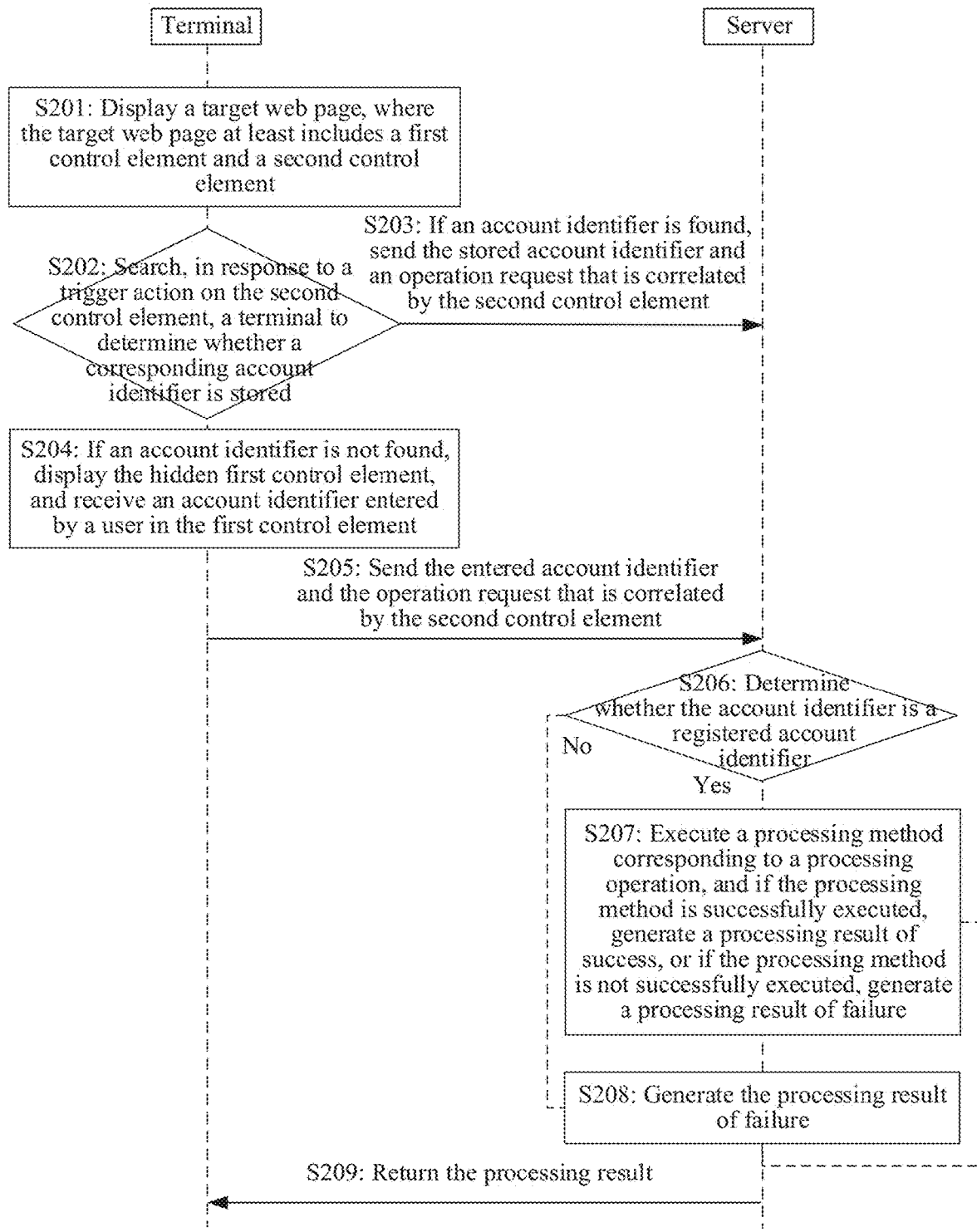
FIG. 7 is a flowchart of a method for processing user operation implementable by a terminal and a server, consistent with exemplary embodiments of the present disclosure.

The method for processing user operation implementable by a terminal is introduced above. A method for processing user operation implementable by a server is introduced below. Referring to FIG. 7, FIG. 7 shows a method for processing user operation provided in the present disclosure. After the terminal sends the account identifier and the operation request to the server according to the method in FIG. 2, the server processes the operation request according to the following steps S206 to S209.

Step S206 includes, after the account identifier and the operation request that is correlated by the second control element are received, determining whether the account identifier is a registered account identifier. If the account identifier is a registered account, step S207 can be performed. If the account identifier is not an identifier of a registered account, step S208 can be performed.

The server stores a registered account identifier, and searches stored account identifiers to determine whether any stored account identifier is the same as the received account identifier. If a stored account identifier that is the same as the received account identifier is found, it indicates that the received account identifier is a registered account identifier. If no stored account identifier is found to be the same as the received account identifier, it indicates that the received account identifier is not a registered account identifier.

Step S207 includes executing a processing procedure corresponding to a processing operation (e.g., corresponding to the account identifier and the correlated operation request). If the processing procedure is successfully executed, a processing result of success can be generated. If the processing procedure is not successfully executed, a processing result of failure can be generated.

Modules for processing various operation requests may be disposed on the server in advance. Different modules process different operation requests. For example, a module 1 is configured to process a "Like" operation, a module 2 is configured to process a "red envelop grabbing" operation, and a module 3 is configured to process a "bookmarking" operation. The server searches, according to a received operation request, for a corresponding module configured to process the operation request, and triggers the module to execute a corresponding procedure to complete processing of the operation request.

Step S208 includes generating the processing result of failure.

Step S209 includes returning the processing result to the terminal.

As such, the processing result may be a success or failure.

In some embodiments, the method for processing user operation implementable by the server may comprise verifying an account identifier sent by the terminal, and executing a processing procedure corresponding to the operation request to generate a processing result. The processing results may comprise two types, a success or a failure.

In another example, the server may further verify an identification code.

For example, the terminal may send the identification code to the server. In some embodiments, the identification code is generated by the server and returned to the terminal. The identification code corresponds to a session (a communication connection between the terminal and the server), and the server records the correspondence. Therefore, when sending the identification code during the same session or another session, the terminal further needs to send a corresponding session identifier. After receiving the identification code and the session identifier, the server first searches the recorded correspondences to determine whether a stored identification code corresponding to the received session identifier is the same as the received identification code. If the stored identification code corresponding to the received session identifier is the same as the received identification code, the server may continue to perform steps S206 to S209. If no stored identification code corresponding to the received session identifier is the same as the received identification code, the server may generate a processing result of failure and return the processing result to the terminal.

Further, after generating the identification code, the server further sets a validity period of the identification code. After the identification code is received, whether the lifetime of the identification code exceeds the validity period can be determined. If the lifetime of the identification code exceeds the validity period, a processing result of failure is generated and returned. The processing result may include prompt information, to prompt the user that the identification code is invalid.

In still another example, the server may further limit a number of sliding actions to the second control element.

For example, the server may preset a number of sliding actions to the second control element within a preset time period on the terminal. For ease of description, the number of sliding action may be referred to as a preset number of slides. After a user account sent by the terminal and the operation request correlated by the second control element are received, it is determined whether a number of sliding actions of the operation request of the terminal within the preset time period exceeds the preset number of sliding actions. If the number of sliding actions exceeds the preset number of sliding actions, a processing result of failure is generated.

As described above, the server can determine whether an identification code exists, determine a validity period of an identification code, determine an account identifier, and determine a number of sliding actions. During implementation, one or more of the determinations may be included. When multiple determinations are included, the multiple determinations may be processed in parallel or sequentially. When the multiple determinations are performed sequentially, a determination result of a prior determination needs to be positive before a next determination can be performed. When all determination results are positive, a processing result of success can be generated. The processing result of success also requires that the server successfully processes the operation request. If one determination result is no, a processing result of failure is generated and is returned to the terminal.

Figure 8:
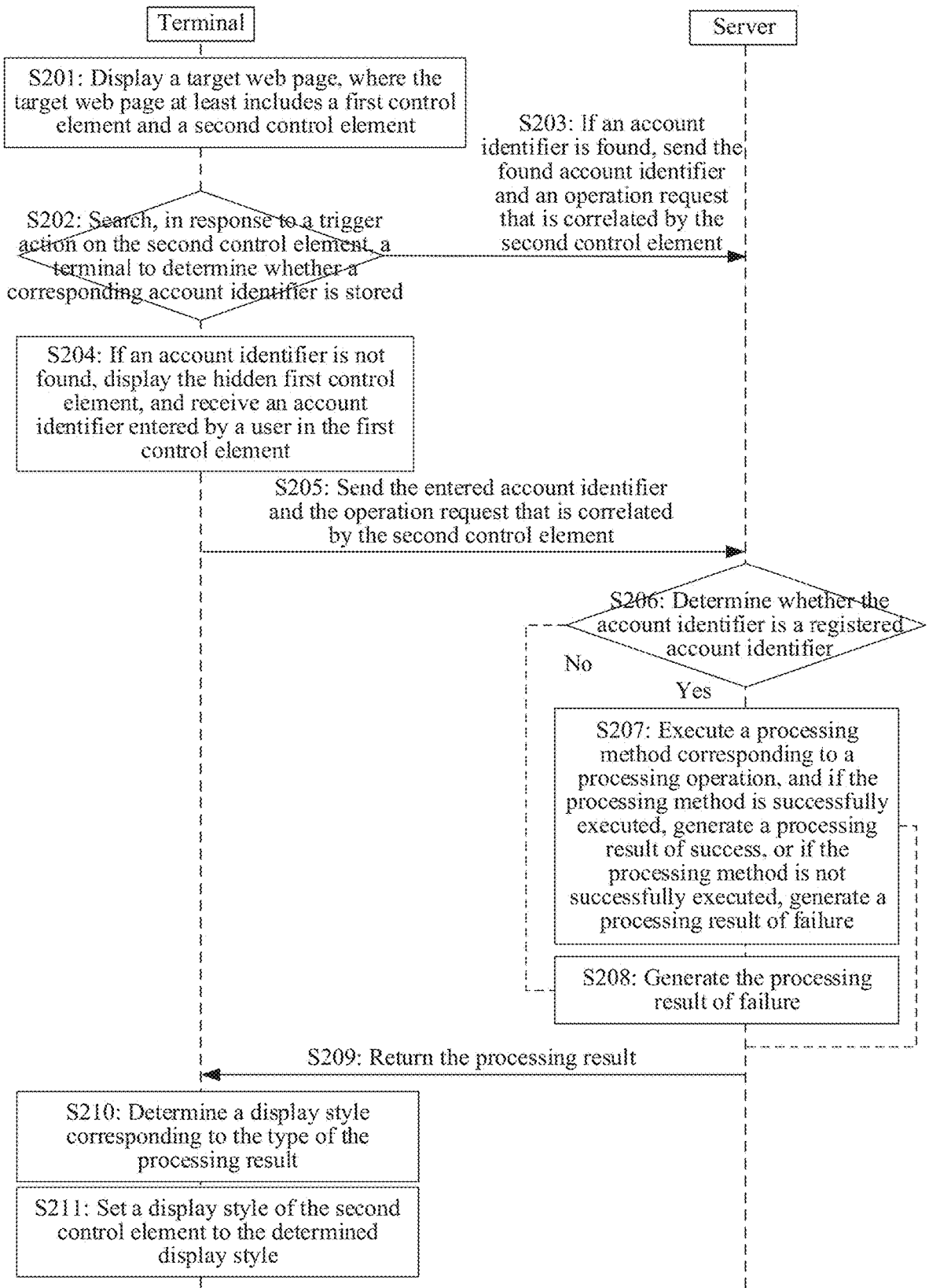
FIG. 8 is a flowchart of another method for processing user operation implementable by a terminal and a server, consistent with exemplary embodiments of the present disclosure.

After generating the processing result of the operation request according to the account identifier, the server may return the processing result to the terminal. The terminal may reflect the processing result on the second control element. For example, for the method shown in FIG. 8, based on the method shown in FIG. 7, the method may further include the following step S210 and step S211.

Step S210 includes, after the processing result returned by the server is received, determining a display style corresponding to the type of the processing result, where the processing result is obtained by the server according to the account identifier and the operation correlated by the second control element.

The types of the processing result returned by the server include success and failure. If the server successfully processes the operation correlated by the second control element, for example, successfully processes "Like", "Grab red envelop," or the like, the server returns a "success" message to the terminal. If the server fails to process the operation correlated by the second control element, the server returns a "failure" message to the terminal.

Different display styles corresponding to the second control element may be preset for the processing results of different types. Different display styles may be represented by using one or more aspects such as fill color, font style, background picture, and usability. For example, when the processing result is success, the fill color of the second control element can be green, and when the processing result is a failure, the fill color of the second control element can be red.

After the processing result returned by the server is received, a display style corresponding to the processing result is determined.

Step S211 includes setting a display style of the second control element to the determined display style.

Figure 9:
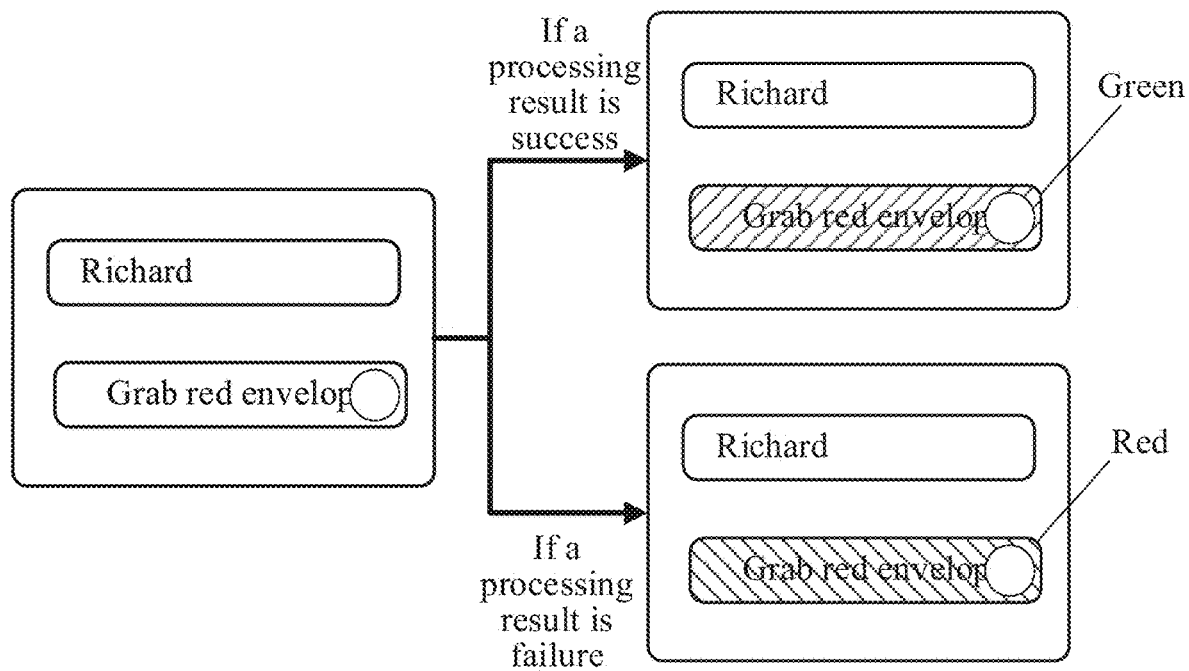
FIG. 9 is a schematic diagram of setting a display style of a second control element according to a processing result, consistent with exemplary embodiments of the present disclosure.

As shown in FIG. 9, if the processing result is success, the slide component of "Grab red envelop" may turn from colorless to green (right diagonal lines represent green), to prompt the user that a red envelop is successfully grabbed. If the processing result is failure, the slide component of "Grab red envelop" may turn from colorless to red, to prompt the user that the red envelop grabbing failed.

Thus, the user can know a processing result of a performed operation more intuitively according to a display style.

In the method for processing user operation provided in the present disclosure, a password does not need to be sent to perform verification. Therefore, to avoid a risk of information theft to the user account, an application scenario of the method may be restricted. In one embodiment, the operation request correlated by the second control element on the target web page may need to meet a preset condition. That is, these operation requests may not include a request to change basic information of a user account or a request to remove asset from the user account.

An operation of changing basic information of a user account includes: changing an account name, changing an account password, changing a linked mobile device or mobile device's number, and the like. An operation of removing asset from the user account includes, for example, making a payment using virtual currency from the user account or transferring of virtual currency from the user account.

The operation request that is correlated by the second control element does not include the foregoing two types of operation requests. From the positive side, the operation request that is correlated by the second control element may include: Like, Add to a shopping cart, Bookmark, Grab a red envelop, Collect earned coins, and the like. Different operation requests correspond to different second control elements, that is, a target web page or different target web pages may include several second control elements, and different second control elements correlate different operation requests. To accomplish an operation request, a user triggers a corresponding second control element. In addition, each second control element can have a first control element corresponding to the second control element. Alternatively, multiple second control elements can share the same first control element.

An example of "Grab red envelop" is provided below.

When a user uses a terminal to access a web page, a control element 1 and a control element 2 shown in FIG. 4B are displayed on the web page. The control element 1 may be in a hidden state, and the control element 2 is a slide component and displays text "Grab red envelop."

When the user wants to perform an operation "Grab red envelop," the user may slide the control element 2. After receiving a slide action of the control element 2, the terminal first searches the terminal locally to determine whether an account identifier used for logging in to a website corresponding to the web page is stored. Assuming that the found account identifier is Richard, the found account identifier Richard and the operation request "Grab red envelop" may be directly sent to a website server. In response to obtaining multiple stored account identifiers, the multiple stored account identifiers may be displayed in the control element 2 in a form of a drop-down list for selection by the user. If only one account identifier is found, for accuracy, the account identifier may be displayed in the control element 2 for confirmation by the user, that is, with a display effect shown in FIG. 5B.

Figure 6B:
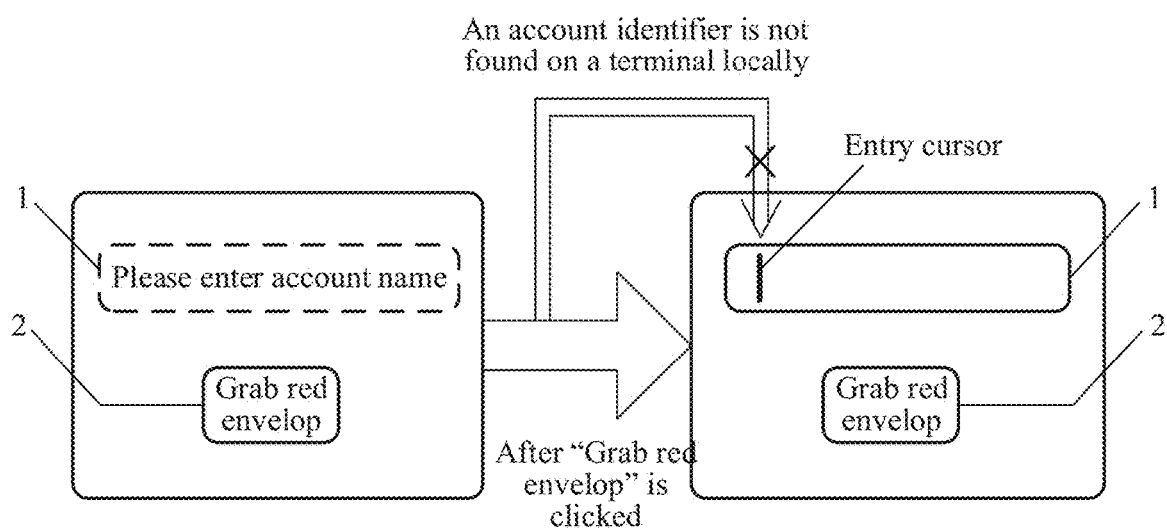

If an account identifier is not locally found on the terminal, as shown in FIG. 6B, a hidden control element 1 is displayed to prompt the user to enter an account identifier in the control element 1. After the user enters an account identifier, the account identifier entered by the user and the operation request "Grab red envelop" may be sent to the website server.

After receiving the account identifier and the operation request, the website server may determine whether the account identifier is registered. If the account identifier is not registered, the website server generates a processing result of failure and returns the processing result to the terminal. If the account identifier is registered, the operation "Grab red envelop" of the user is processed. If the user successfully grabs a red envelop, the website server generates a processing result of success and returns the processing result to the terminal. In addition, the website server may further return an amount of the grabbed red envelop to the terminal.

The terminal may set a display style of a control element according to a processing result, prompting the processing result to the user. As shown in FIG. 9, if the processing result is success, a background color of the control element 2 can be set to green, and an amount of the grabbed red envelop may be displayed on the control element 2. If the processing result is failure, the background color of the control element 2 can be set to red, and the text "failure" may be displayed on the control element 2, more intuitively prompting the user that the red envelop grabbing failed.

Furthermore, to perform human-machine identification, the terminal may monitor a slide parameter such as slide speed and slide duration during a slide process of the control element 2 and send the slide parameter to the website server to perform verification. If the website server determines according to the slide parameter that the slide operation is performed by the user, the website server may return an identification code. The identification code is unique and has a correspondence with a session. That is, different sessions between the terminal and the website server correspond to different identification codes.

The website server records the identification code returned to the server and a session corresponding to the identification code. After sliding of the control element 2 is completed, the terminal sends the identification code, a current session identifier, an account identifier, and an operation request together to the website server. Before verifying the account identifier, the website server may determine whether the recorded session corresponding to the account identifier is the same as the session represented by the received current session identifier. If the recorded session corresponding to the account identifier is the same as the session represented by the received current session identifier, the website server performs a subsequent operation of verifying the account identifier. If the recorded session corresponding to the account identifier is different from the session represented by the received current session identifier, the website server returns a processing result of failure to the terminal, and prompts the terminal that the identification code is invalid.

Figure 10:
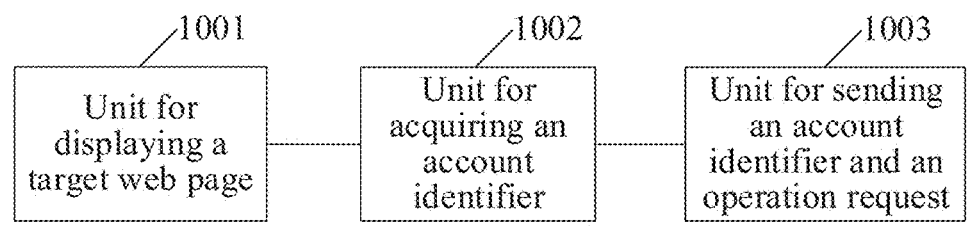
FIG. 10 is a schematic structural diagram of an apparatus for processing user operation implementable on a terminal, consistent with exemplary embodiments of the present disclosure.

Referring to FIG. 10, FIG. 10 shows the structure of an apparatus for processing user operation implementable on a terminal (e.g., a mobile terminal such as a mobile phone) provided in the present disclosure. As shown in FIG. 10, the apparatus includes: a unit for displaying a target web page 1001, configured to display a target web page, where the target web page includes a first control element and a second control element, the first control element is configured to acquire an account identifier, and the second control element is configured to correlate the account identifier and an operation request that is executable only after an account is logged in; a unit for acquiring an account identifier 1002, configured to acquire an account identifier in response to a trigger action on the second control element; and a unit for sending an account identifier and an operation request 1003, configured to send the account identifier and the operation request that is correlated by the second control element to a server corresponding to the target web page. In some embodiments, the second control element is not configured to capture authentication data for logging into an account corresponding to the account identifier.

In some embodiments, the first control element is in a hidden state. When the step of acquiring an account identifier in response to a trigger action on the second control element is performed, the unit for acquiring an account identifier 1002 is configured to: search, in response to the trigger action on the second control element, the terminal locally to determine whether an account identifier corresponding to the target web page is stored; and use, if an account identifier is found, the found account identifier as the acquired account identifier.

In some embodiments, the unit for acquiring an account identifier 1002 is further configured to: display the first control element in response to obtaining multiple stored account identifiers corresponding to the target web page; display the multiple stored account identifiers in the first control element, and use, in response to a selection instruction of a user, an account identifier selected by the user as the acquired account identifier.

In some embodiments, the unit for acquiring an account identifier 1002 is further configured to: display the first control element in response to that no stored account identifier corresponding to the target web page is found, and receive an account identifier entered by a user in the first control element.

In some embodiments, when the step of acquiring an account identifier in response to a trigger action on the second control element is performed, the unit for acquiring an account identifier 1002 is configured to: monitor the trigger action on the second control element, and acquire the account identifier if the trigger action meets a preset trigger condition.

In some embodiments, the second control element is a slide control element. When the step of monitoring the trigger action on the second control element is performed, the unit for acquiring an account identifier 1002 is configured to: monitor a slide parameter of the second control element, where the slide parameter includes one or more subparameters of: slide frequency, slide speed, and slide duration.

In some embodiments, when the step of acquiring the account identifier if the trigger action meets a preset trigger condition is performed, the unit for acquiring an account identifier 1002 is configured to: determine, if the slide parameter includes the subparameter slide frequency, whether the slide frequency is greater than a preset frequency threshold, to obtain a determination result corresponding to the slide frequency; determine, if the slide parameter includes the subparameter slide speed, whether the slide speed is greater than a preset speed threshold, to obtain a determination result corresponding to the slide speed; determine, if the slide parameter includes the subparameter slide duration, whether the slide duration is less than a preset duration threshold, to obtain a determination result corresponding to the slide duration; and acquire the account identifier if the determination results corresponding to the subparameters included in the slide parameter are all positive.

In some embodiments, when the step of acquiring the account identifier if the trigger action meets a preset trigger condition is performed, the unit for acquiring an account identifier 1002 is configured to: send the detected trigger action to the server corresponding to the target web page, where the trigger action is used by the server to determine whether the trigger action meets the preset trigger condition and return a determination result, and acquire the account identifier if the received determination result returned by the server is positive.

In some embodiments, the apparatus for processing user operation further includes: a unit for receiving an identification code, configured to receive an identification code returned by the server, where the identification code is generated by the server when the trigger action meets the preset trigger condition, and a correspondence exists between the identification code and a session that exists when the identification code is generated. When the step of sending the account identifier and the operation request that is correlated by the second control element to a server corresponding to the target web page is performed, the unit for sending an account identifier and an operation request 1003 is configured to: send an identifier of the current session between the terminal and the server corresponding to the target web page, the identification code, the account identifier, and the operation request that is correlated by the second control element to the server corresponding to the target web page.

In some embodiments, the apparatus for processing user operation further includes: a unit for setting a style of a second control element, configured to: after a processing result returned by the server is received, determine a display style corresponding to a type of the processing result, where the processing result is obtained by the server according to the account identifier and an operation correlated by the second control element; and set a display style of the second control element to the determined display style.

Figure 11:
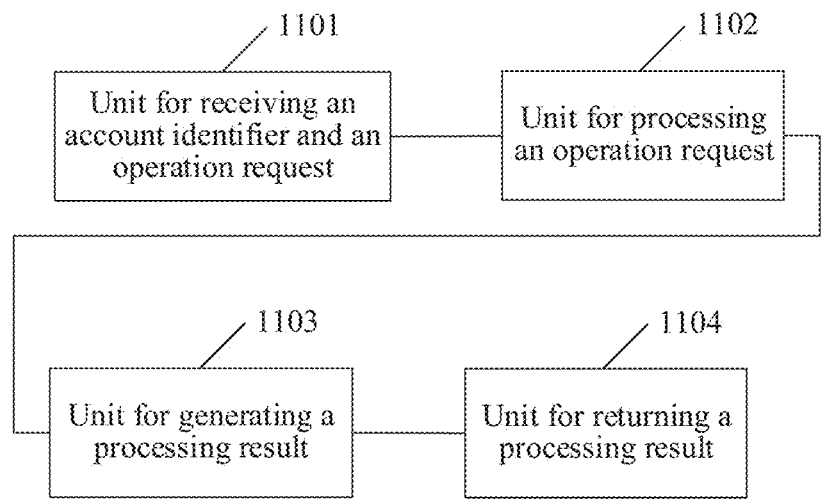
FIG. 11 is a schematic structural diagram of an apparatus for processing user operation implementable on a server, consistent with exemplary embodiments of the present disclosure.

Referring to FIG. 11, the present disclosure further provides the structure of an apparatus for processing user operation implementable on a server. As shown in FIG. 11, the apparatus includes: a unit for receiving an account identifier and an operation request 1101, configured to: after an account identifier that is sent by a terminal and an operation request that is correlated by a second control element are received, determine whether the account identifier is an identifier of a registered account; and if the account identifier is an identifier of a registered account, trigger a unit for processing an operation request 1102; the unit for processing an operation request 1102, configured to execute a processing procedure corresponding to a processing operation (e.g., corresponding to the account identifier and the correlated operation request), to obtain an execution result; a unit for generating a processing result 1103, configured to generate, according to the execution result, a processing result corresponding to the execution result; and a unit for returning a processing result 1104, configured to return the processing result to the terminal.

In some embodiments, the unit for returning a processing result 1104 is further configured to: if the account identifier is not an identifier of a registered account, return a processing result to the terminal, where a type of the processing result is failure.

Figure 12:
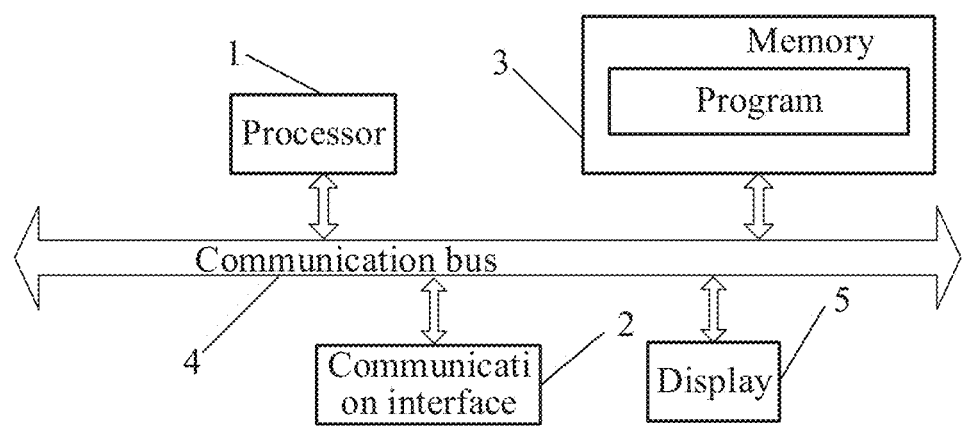
FIG. 12 is a structural diagram of computer hardware of a terminal, consistent with exemplary embodiments of the present disclosure.

Referring to FIG. 12, FIG. 12 shows the structure of a computing device provided in the present disclosure. The computing device includes: a processor 1, a communication interface 2, a memory 3, a communication bus 4, and a display 5.

The processor 1, the communication interface 2, the memory 3, and the display 5 may perform communication with each other by using the communication bus 4.

Optionally, the communication interface 2 may be an interface of a communications module, for example, an interface of a GSM (global system for mobile communication) module.

The processor 1 is configured to execute a program.

The memory 3 is configured to store the program.

The program may include program codes, and the program codes include operation instructions of the processor 1 (e.g., various units or modules described herein).

The processor 1 may be a central processing unit (CPU), or an application specific integrated circuit (ASIC), or one or more integrated circuits configured to implement the embodiments of the present disclosure.

The memory 3 may include a high-speed RAM memory, or may further include a non-volatile memory for example, at least one magnetic disk memory. The memory 3 may be a non-transitory computer-readable storage medium storing instructions that, when executed by the processor 1, cause the processor 1 to perform various methods disclosed herein. The processor 1 and the memory 3 can be coupled to each other and can be implemented on a server or a terminal such as a mobile phone. The instructions may comprise various units or modules described herein. For example, the units described above and shown in the drawings, e.g., FIGS. 10 and 11, can be program units stored in memory 3.

The display 5 is configured to display a target web page, where the target web page includes a first control element and a second control element, the first control element is configured to acquire an account identifier, and the second control element is configured to correlate the account identifier and an operation request that is executable only after an account is logged in.

The processor 1 is configured to acquire an account identifier in response to a trigger action on the second control element.

The communication interface 2 is configured to send the account identifier and the operation request that is correlated by the second control element to a server corresponding to the target web page.

The present disclosure further provides a server, and includes: a processor and a communication interface.

The processor is configured to: after an account identifier that is sent by a terminal and an operation request that is correlated by a second control element are received, determine whether the account identifier is an identifier of a registered account; if the account identifier is an identifier of a registered account, execute a processing procedure corresponding to a processing operation (e.g., corresponding to the account identifier and the correlated operation request), to obtain an execution result; and generate, according to the execution result, a processing result corresponding to the execution result.

The communication interface is configured to return the processing result to the terminal.

The embodiments in this specification are all described in a progressive manner. Description of each of the embodiments focuses on differences from other embodiments, and reference may be made to each other for the same or similar parts among respective embodiments.

The relational terms herein such as first and second are used only to differentiate an entity or operation from another entity or operation, and do not require or imply any actual relationship or sequence between these entities or operations. Moreover, the terms "include," "comprise," and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . ." does not exclude other similar elements existing in the process, the method, the article, or the device that includes the element.

The foregoing description of the disclosed embodiments enables a person skilled in the art to implement or use the present disclosure. It is apparent to a person skilled in the art to make various changes to these embodiments. The general concept defined in the specification may be implemented in other embodiments without departing from the spirit and scope of the present disclosure. Therefore, the present disclosure is not limited to these embodiments shown in the specification, and instead is to meet the widest range consistent with the principles and novel features disclosed in the specification.

What is claimed is:

1. A method for processing an operation, comprising:
displaying, by a terminal, a target web page, wherein the target web page comprises a first control element and a second control element, the first control element is implemented by the terminal and configured to acquire an account identifier for an account, and the second control element is implemented by the terminal and configured to correlate the account identifier and an operation request for executing the operation request without logging in the account after the operation request is correlated with the account identifier, wherein the operation request is for an operation with respect to the account other than operations related to logging into the account, wherein the second control element is a slide control element;
monitoring a trigger action on the second control element by monitoring a slide parameter of the second control element, wherein the slide parameter comprises at least one of: a slide frequency, a slide speed, or a slide duration;
determining, if the slide parameter comprises the slide frequency, whether the slide frequency is greater than a preset frequency threshold to obtain a determination result corresponding to the slide frequency;
determining, if the slide parameter comprises the slide speed, whether the slide speed is greater than a preset speed threshold to obtain a determination result corresponding to the slide speed;
determining, if the slide parameter comprises the slide duration, whether the slide duration is less than a preset duration threshold to obtain a determination result corresponding to the slide duration;
in response to that the determination results for the slide parameter are all positive, searching, by the terminal, the terminal to determine whether an account identifier corresponding to the target web page is stored locally at the terminal;
in response to determining that the account identifier corresponding to the target web page is stored locally at the terminal, acquiring and displaying, by the terminal, the account identifier corresponding to the target web page at the first control element, and
sending, by the terminal, the account identifier corresponding to the target web page and the operation request that is correlated by the second control element to a server corresponding to the target web page.

2. The method according to claim 1, wherein:
the second control element is not configured to capture authentication data for logging into the account corresponding to the account identifier.

3. The method according to claim 1, wherein the first control element is in a hidden state before acquiring the account identifier corresponding to the target web page.

4. The method according to claim 3, further comprising:
displaying the first control element in response to obtaining multiple stored account identifiers corresponding to the target web page;
displaying the multiple stored account identifiers in the first control element; and
using, in response to a selection instruction of a user, an account identifier selected by the user as the account identifier for the first control element.

5. The method according to claim 3, further comprising:
displaying the first control element in response to that no stored account identifier corresponding to the target web page is found; and
receiving an account identifier entered by a user in the first control element.

6. The method according to claim 1, further comprising:
sending the trigger action to the server corresponding to the target web page, causing the server to determine whether the trigger action meets a preset trigger condition and return a server determination result; and
if the received server determination result returned by the server is positive, searching the terminal to determine whether the account identifier corresponding to the target web page is stored locally at the terminal.

7. The method according to claim 6, wherein the method further comprises:
receiving an identification code returned by the server, wherein the identification code is generated by the server when the trigger action meets the preset trigger condition, and the identification code corresponds to a session at which the identification code is generated; and
wherein sending the account identifier corresponding to the target web page and the operation request that is correlated by the second control element to the server corresponding to the target web page comprises:
sending an identifier of the session between the terminal and the server, the identification code, the account identifier corresponding to the target web page, and the operation request to the server.

8. The method according to claim 1, further comprising:
after a processing result returned by the server is received, determining a display style corresponding to a type of the processing result, wherein the processing result is obtained by the server according to the account identifier corresponding to the target web page and the operation correlated by the second control element; and
setting a display style of the second control element to be the determined display style.

9. The method according to claim 1, wherein the trigger action is not previously associated with the account identifier.

10. An apparatus for processing an operation, implementable on a terminal, the apparatus comprising a processor and a non-transitory computer-readable storage medium storing instructions that, when executed by the processor, cause the processor to perform operations comprising:
displaying a target web page, wherein the target web page comprises a first control element and a second control element, the first control element is configured to acquire an account identifier for an account, and the second control element is configured to correlate the account identifier and an operation request for executing the operation request without logging in the account after the operation request is correlated with the account identifier, wherein the operation request is for an operation with respect to the account other than operations related to logging into the account, wherein the second control element is a slide control element;
monitoring a trigger action on the second control element by monitoring a slide parameter of the second control element, wherein the slide parameter comprises at least one of: a slide frequency, a slide speed, or a slide duration;
determining, if the slide parameter comprises the slide frequency, whether the slide frequency is greater than a preset frequency threshold to obtain a determination result corresponding to the slide frequency;

determining, if the slide parameter comprises the slide speed, whether the slide speed is greater than a preset speed threshold to obtain a determination result corresponding to the slide speed;

determining, if the slide parameter comprises the slide duration, whether the slide duration is less than a preset duration threshold to obtain a determination result corresponding to the slide duration;

in response to that the determination results for the slide parameter are all positive, searching the terminal to determine whether an account identifier corresponding to the target web page is stored locally at the terminal;

in response to determining that the account identifier corresponding to the target web page is stored locally at the terminal, acquiring and displaying the account identifier corresponding to the target web page at the first control element; and sending the account identifier corresponding to the target web page and the operation request that is correlated by the second control element to a server corresponding to the target web page.

11. The apparatus according to claim 10, wherein:
the second control element is not configured to capture authentication data for logging into the account corresponding to the account identifier.

12. The apparatus according to claim 10, wherein the first control element is in a hidden state before acquiring the account identifier corresponding to the target web page.

13. The apparatus according to claim 12, wherein the operations further comprise:
displaying the first control element in response to obtaining multiple stored account identifiers corresponding to the target web page;
displaying the multiple stored account identifiers in the first control element; and
using, in response to a selection instruction of a user, an account identifier selected by the user as the account identifier for the first control element.

14. The apparatus according to claim 12, wherein the operations further comprise:
displaying the first control element in response to that no stored account identifier corresponding to the target web page is found; and
receiving an account identifier entered by a user in the first control element.

15. The apparatus according to claim 10, further comprising:
sending the trigger action to the server corresponding to the target web page, causing the server to determine whether the trigger action meets a preset trigger condition and return a server determination result; and
if the received server determination result returned by the server is positive, searching the terminal to determine whether the account identifier corresponding to the target web page is stored locally at the terminal.

16. The apparatus according to claim 15, wherein the operations further comprise:
receiving an identification code returned by the server, wherein the identification code is generated by the server when the trigger action meets the preset trigger condition, and the identification code corresponds to a session at which the identification code is generated; and
wherein sending the account identifier corresponding to the target web page and the operation request that is correlated by the second control element to the server corresponding to the target web page comprises:
sending an identifier of the session between the terminal and the server, the identification code, the account identifier corresponding to the target web page, and the operation request to the server.

17. The apparatus according to claim 10, wherein the operations further comprise:
after a processing result returned by the server is received, determining a display style corresponding to a type of the processing result, wherein the processing result is obtained by the server according to the account identifier corresponding to the target web page and the operation correlated by the second control element; and
setting a display style of the second control element to the determined display style.

18. A terminal, comprising:
a display, configured to display a target web page, wherein the target web page comprises a first control element and a second control element, the first control element is configured to acquire an account identifier for an account, and the second control element is configured to correlate the account identifier and an operation request for executing the operation request without logging in the account after the operation request is correlated with the account identifier, wherein the operation request is for an operation with respect to the account other than operations related to logging into the account, wherein the second control element is a slide control element;
a processor, configured to
monitor a trigger action on the second control element by monitoring a slide parameter of the second control element, wherein the slide parameter comprises at least one of: a slide frequency, a slide speed, or a slide duration;
determine, if the slide parameter comprises the slide frequency, whether the slide frequency is greater than a preset frequency threshold to obtain a determination result corresponding to the slide frequency;
determine, if the slide parameter comprises the slide speed, whether the slide speed is greater than a preset speed threshold to obtain a determination result corresponding to the slide speed;
determine, if the slide parameter comprises the slide duration, whether the slide duration is less than a preset duration threshold to obtain a determination result corresponding to the slide duration;
in response to that the determination results for the slide parameter are all positive, search the terminal to determine whether an account identifier corresponding to the target web page is stored locally at the terminal;
in response to determining that the account identifier corresponding to the target web page is stored locally at the terminal, acquire and display the account identifier corresponding to the target web page at the first control element; and
a communication interface, configured to send the account identifier corresponding to the target web page and the operation request that is correlated by the second control element to a server corresponding to the target web page.

19. The terminal according to claim 18, wherein:
the second control element is not configured to capture authentication data for logging into the account corresponding to the account identifier.

20. The terminal according to claim 18, wherein the first control element is in a hidden state before acquiring the account identifier corresponding to the target web page.

21. The terminal according to claim 20, wherein the processor is further configured to:
- cause the display to display the first control element in response to obtaining multiple stored account identifiers corresponding to the target web page;
- cause the display to display the multiple stored account identifiers in the first control element; and
- use, in response to a selection instruction of a user, an account identifier selected by the user as the account identifier for the first control element.

22. The terminal according to claim 20, wherein the processor is further configured to:
- cause the display to display the first control element in response to that no stored account identifier corresponding to the target web page is found; and
- receive an account identifier entered by a user in the first control element.

* * * * *